United States Patent [19]
Johnston

[11] Patent Number: 4,731,030
[45] Date of Patent: Mar. 15, 1988

[54] TILT AND SWIVEL ASSEMBLY FOR TERMINAL MONITOR

[75] Inventor: John N. Johnston, North Plainfield, N.J.

[73] Assignee: Unisys Corporation, Blue Bell, Pa.

[21] Appl. No.: 1,798

[22] Filed: Jan. 9, 1987

[51] Int. Cl.⁴ .......................................... H01R 39/00
[52] U.S. Cl. ........................................ 439/6; 439/10; 439/13; 439/351
[58] Field of Search ............... 439/6, 8, 10, 11, 13, 439/17, 350, 351, 353; 248/346, 349

[56] References Cited
U.S. PATENT DOCUMENTS 3,022,096  2/1962  Schwartz ........................... 439/8
4,473,206  9/1984  Stillinger .......................... 248/346
4,547,027  10/1985 Scheibenreif ...................... 439/13
4,589,713  5/1986  Pfuhl et al. ........................ 248/349
4,591,123  5/1986  Bradshaw et al. .................. 248/349

Primary Examiner—Gil Weidenfeld
Assistant Examiner—David Pirlot
Attorney, Agent, or Firm—Mark T. Starr

[57] ABSTRACT

Disclosed is a tilt/swivel mechanism for supporting a display monitor. The mechanism includes separate tilt ball and pedestal assemblies which may be snapped together without the use of tools. In like manner, any one of various monitors may be snapped onto the tilt ball assembly to provide a complete data display system.

3 Claims, 14 Drawing Figures

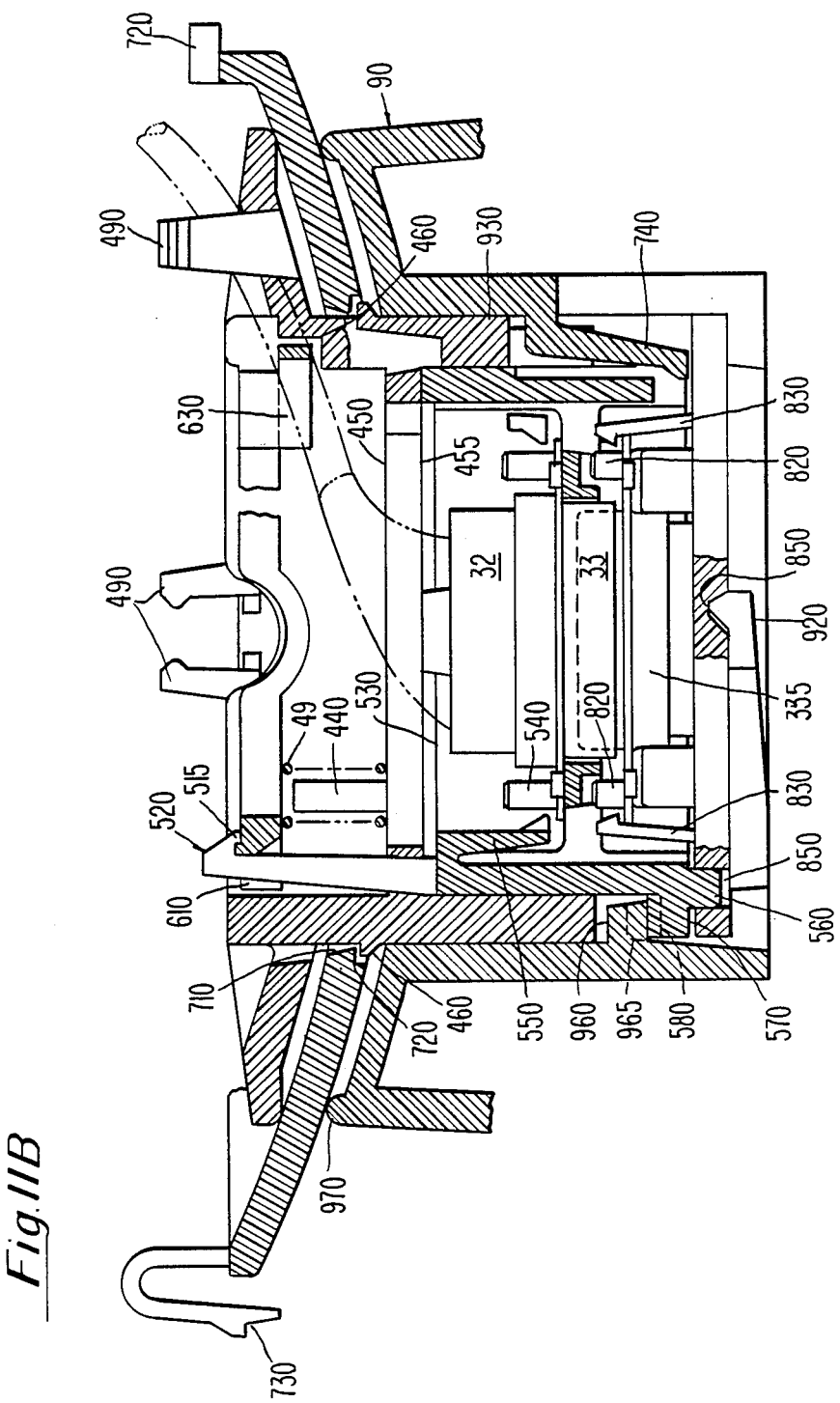

TILT AND SWIVEL ASSEMBLY FOR TERMINAL MONITOR

BACKGROUND OF THE INVENTION

In the prior art, data display terminals or monitors have been designed to provide optimum comfort to the user. Toward this end, various arrangements are known for permitting a monitor to be tilted and swiveled.

Examples of such prior tilt swivel mechanism are those disclosed in prior application Ser. Nos. 627,855 and 683,578, filed July 5, 1984 and Dec. 19, 1984 respectively by Ralph Lake and assigned to the same assignee as the present application.

In prior data display terminals, the tilt swivel mechanism is integral with the monitor and thus difficult and costly to assemble. Further, such prior art terminals often require adjustment by the user each time the monitor position is changed.

It is an object of the present invention to provide improvements over the prior art which permit a tilt/swivel mechanism to be prepared in separate assemblies, including enclosed electrical cables and integral electrical connectors, which can be easily put together without the need for tools and with all assemblies keyed for foolproof assembly.

OBJECTS OF THE PRESENT INVENTION

The present invention incorporates three significant functions in a terminal monitor; namely, a spring preload, a connector interface, and a tilt swivel capability. These functions permit the tilt swivel mechanism to be economically prepared in separate assemblies that are easily assembled without the need for tools.

The present invention incorporates integral electrical connectors in the assemblies which are mated as a consequence of the assembly of the separate tilt-swivel assemblies.

The present invention can provide various levels of required tilt-swivel effort of "feel" by using different preload springs, the effort level being chosen at the time of assembly. The inclusion of this feature frees the user of having to loosen and tighten an awkward and expensive adjusting mechanism each time the monitor position is to be changed.

The present invention further provides a tilt swivel mechanism which may be sold as a separate product or bundled with a monitor.

These and other objects, features and advantages of the present invention will become more apparent from the drawings when viewed in conjunction with the following detailed description of the invention.

DESCRIPTION OF THE DRAWINGS

FIGS. 11A and 11B show the support and pedestal subassemblies of FIGS. 2A-2F coupled together prior to and after assembly rotation respectively.

DETAILED DESCRIPTION OF THE INVENTION

Figure 1:
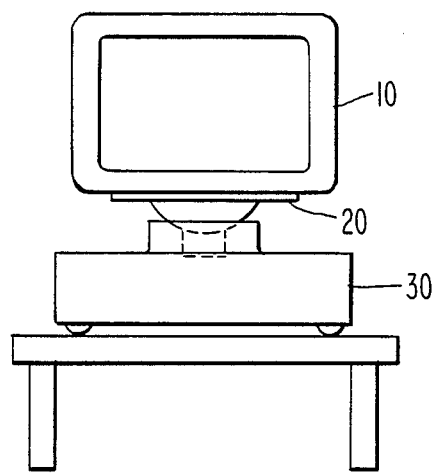
FIG. 1 is a front elevational view of a terminal system including the tilt-swivel mechanism of the present invention.

In the description to follow, what will be described are the various assemblies which when combined as shown in FIGS. 2A through 11B yield the final display terminal.

In the following description, major assemblies are itemized by two-digit reference numerals; i.e., pedestal 90. The elements of each major assembly are identified by related three digit reference numerals; i.e., keyway 910 of pedestal 90. For ease of understanding, identical elements are not all numbered unless the identical elements perform different functions; i.e., the four ribs 960 of pedestal 90 are all identified by the same reference numeral.

Referring to FIG. 1, the present invention relates to a tilt and swivel support apparatus for a cathode ray tube monitor 10 of the type used in data display systems. The monitor 10 is snapped onto a support apparatus 20 which in turn is inserted into a pedestal assembly 30 which may or may not contain the functional electronics for the system (FIGS. 2A-2F).

Referring to FIGS. 2A-2F and 11B, the assembly of the support apparatus 20, known also as the tilt ball assembly 20, to the pedestal 30 and the monitor 10, is as follows:

1. The interconnecting cable is snapped into tilt ball assembly 20 which is snapped into the base of monitor 10. (FIGS. 2A and 2B, front and partial side views respectively).

Figure 2B:
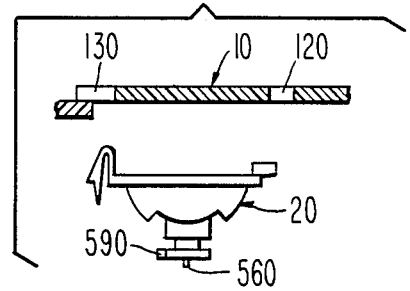
FIGS. 2A-2F illustrate how the monitor, support (or tilt ball assembly) and pedestal assemblies of the present invention are assembled into a terminal system.
Figure 2A:
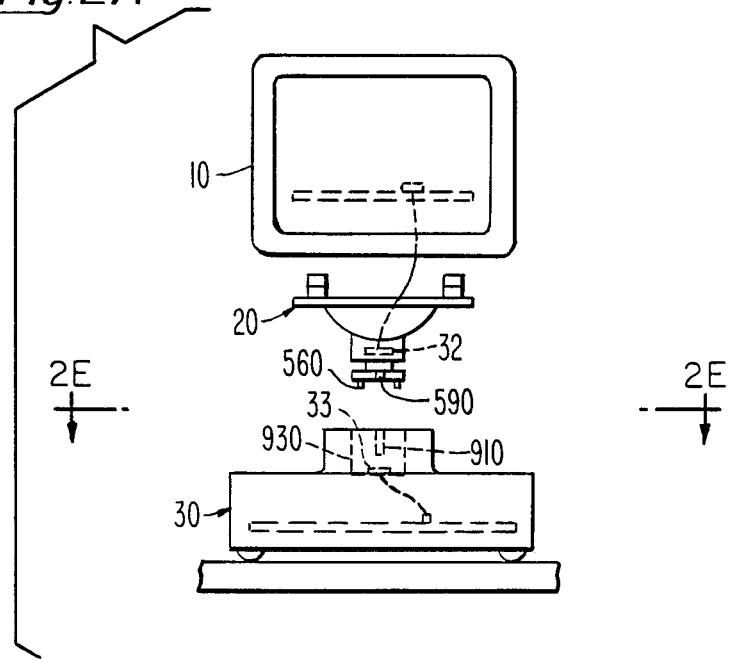
Figure 2C:
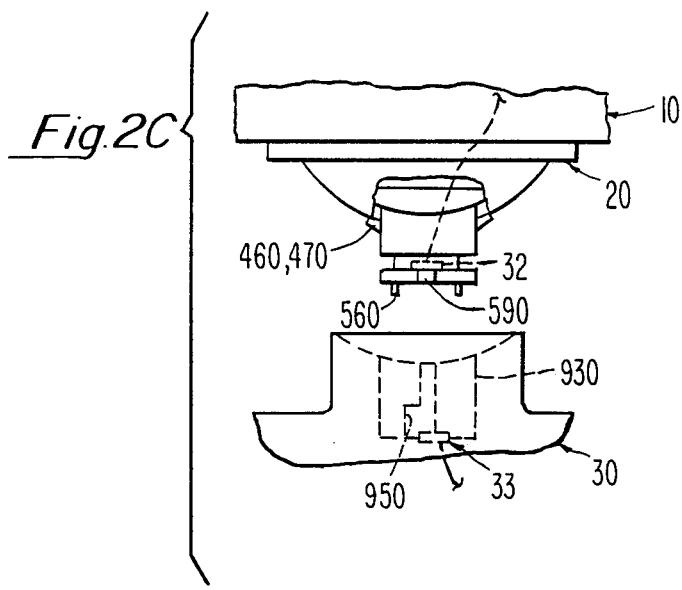
Figure 2D:
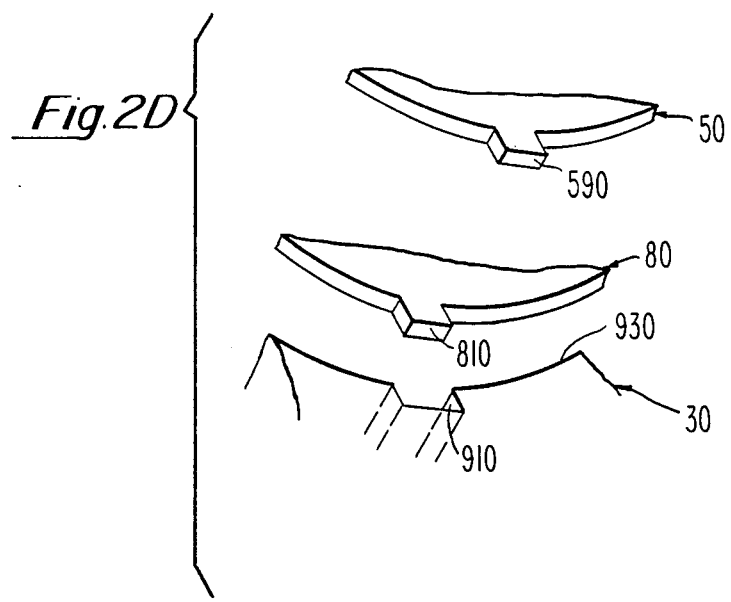

2. Rectangular keys 590 and 810 on tilt ball assembly 20 are aligned with rectangular keyway 910 in pedestal assembly 30. (FIG. 2D).

3. Monitor 10 in assembly with tilt-ball 20 is lowered into circular opening 930 in pedestal until the two connectors 32 and 33 mate together. (FIG. 2C).

Figure 2E:
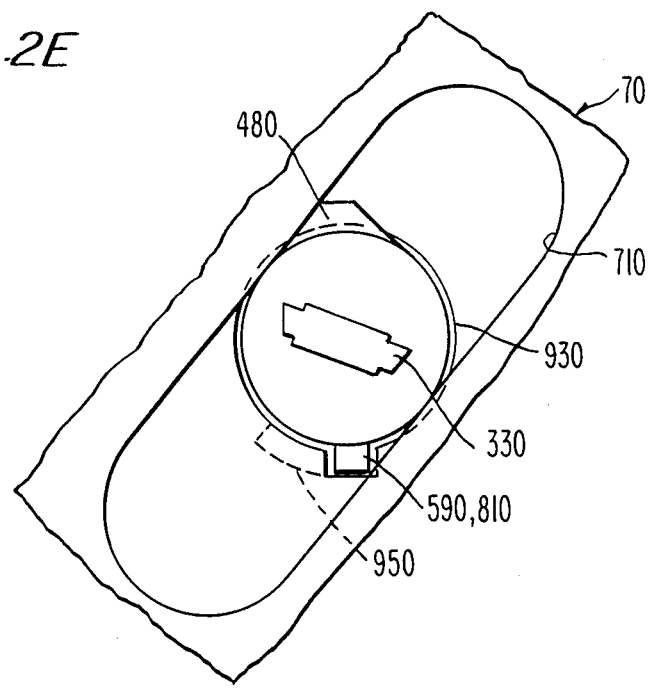
Figure 2F:
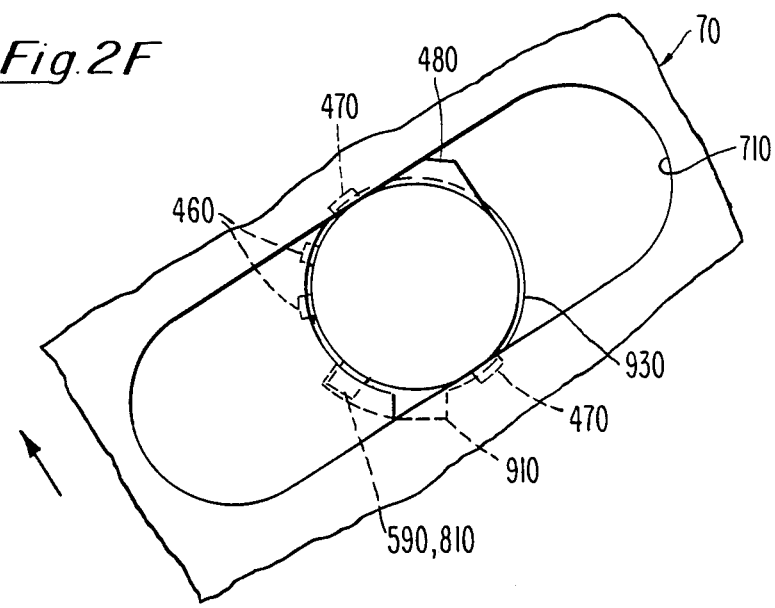

4. The keys 590 and 810 now are clear of the keyway 910 and are free to rotate in recess 950 in circular opening 930 in pedestal 90. (FIG. 2E, pre-latched position).

5. Rotating the monitor 10 through 18 degrees, (FIG. 2F, latched position) in the direction of the arrow, engages snaps, 850 and 851, (FIGS. 6C and 6D) which locks and positions tilt ball assembly 20 in the proper orientation for monitor activation. Flanges 570 and 960 (FIG. 11B) are also engaged for prevention of pull-out of tilt ball 20 when the monitor is lifted. Assembly rotation forces the connectors 32,33 to mated position.

6. The monitor 10 now is latched in assembly and can be tilted or swiveled to any position.

7. For repair or transport, the monitor 10 can easily be unlatched by the user and removed from the pedestal 30.

The tilt swivel assembly is prepared in two assemblies, namely the tilt ball assembly 20 and pedestal assembly 30.

Figure 7A:
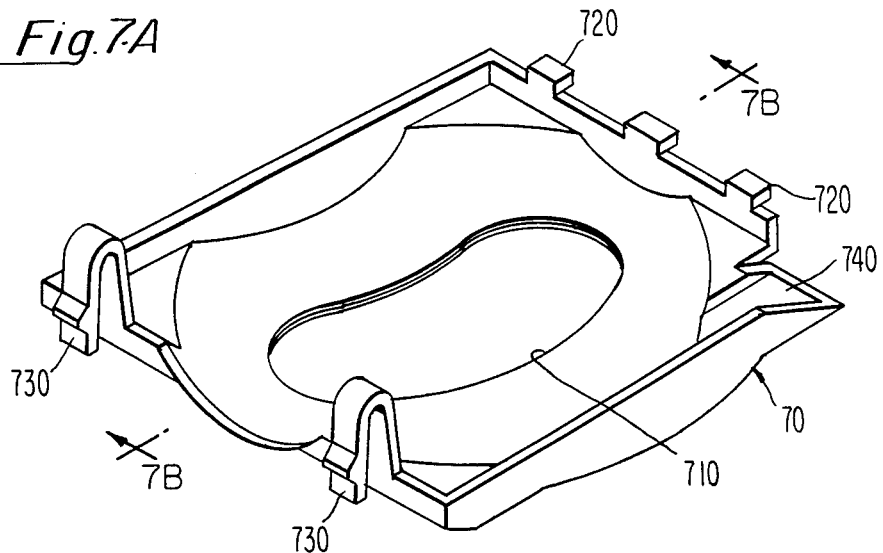
FIGS. 7A-7C show various views of the ball subassembly of the pedestal assembly of FIGS. 2A-2F.
Figure 7B:
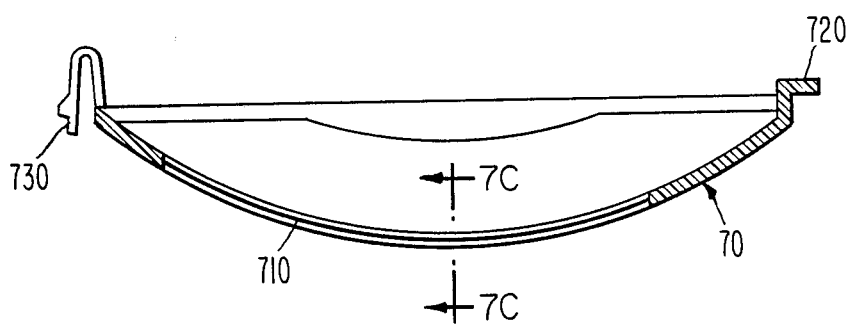
Figure 7C:
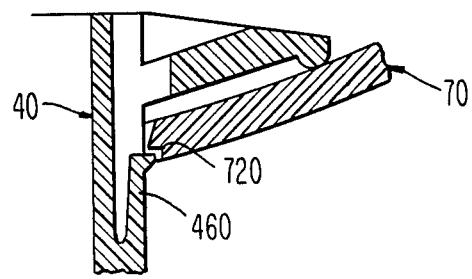

The tilt ball assemby 20 is comprised of a circular and spherical-shaped shoe 40 (FIGS. 3A-3I), a circular upper connector carrier 50 (FIGS. 4A-4F), compression coil springs 49 (FIG. 3A), circular spring retainer 60 (FIG. 5), and a spherical-shaped ball 70 (FIGS. 7A-7C). Clearances and mounting configurations for the connector harnesses are provided and will be described.

Figure 3A:
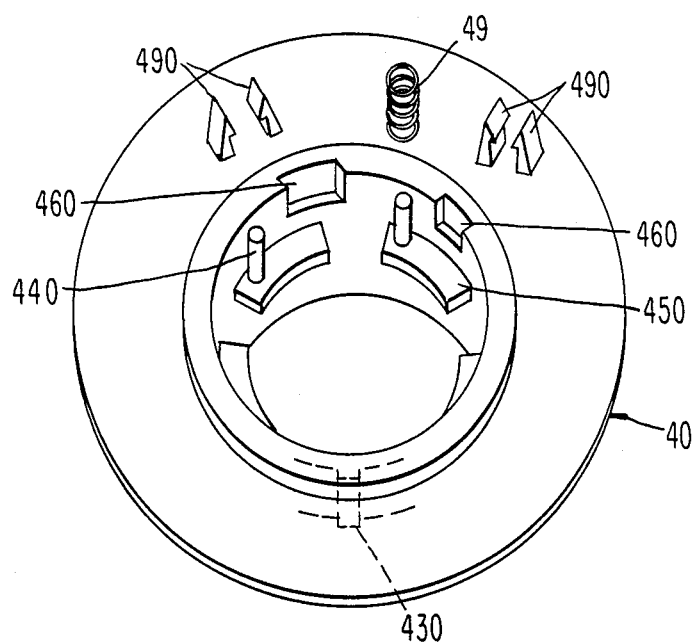
FIGS. 3A-3I show various views of the circular and spherical-shaped shoe subassembly of the tilt ball assembly of FIGS. 2A-2F.
Figure 3B:
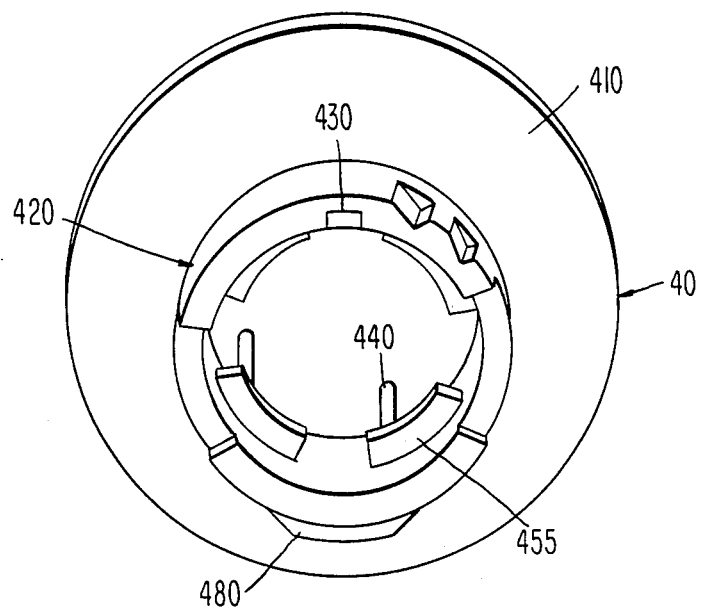
Figure 3C:
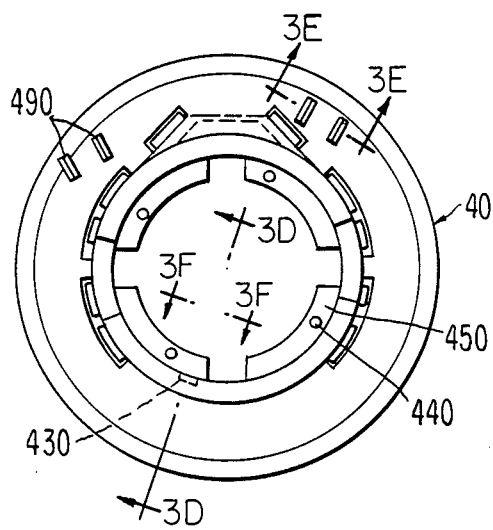
Figure 3E:
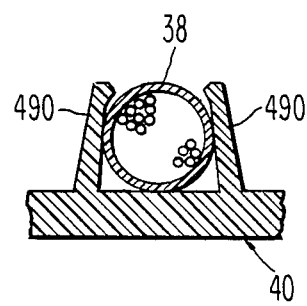
Figure 3H:
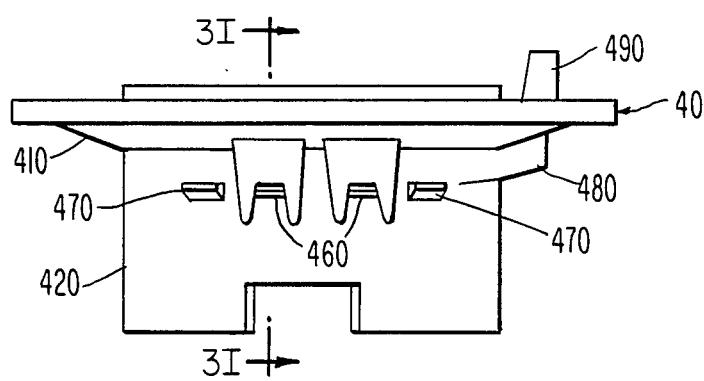
Figure 3I:
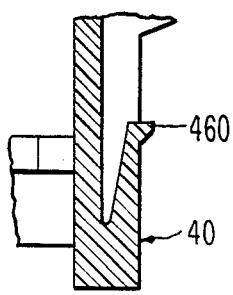
Figure 3D:
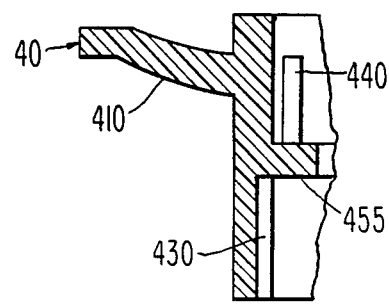
Figure 3F:
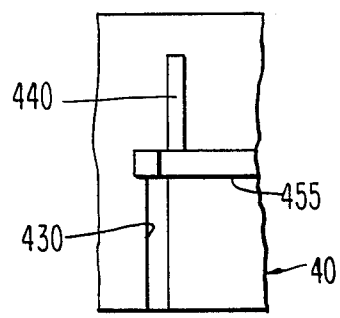
Figure 3G:
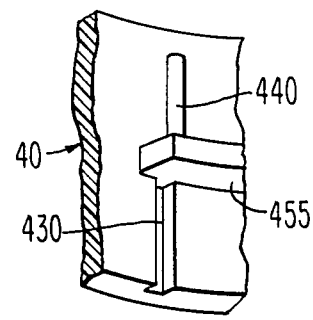
Figure 4A:
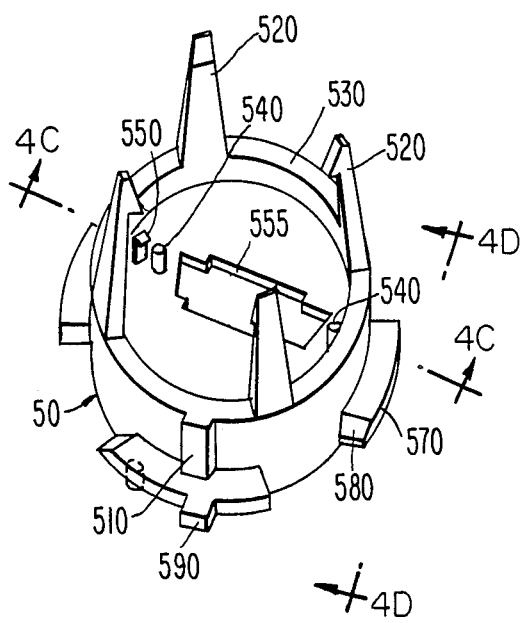
FIGS. 4A-4F show various views of the upper connector carrier subassembly of the tilt ball assembly of FIGS. 2A-2F.
Figure 4B:
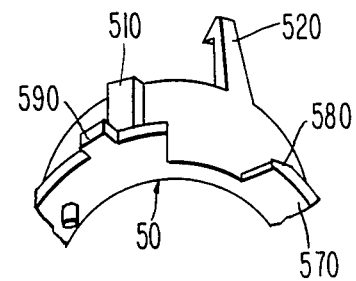
Figure 4F:
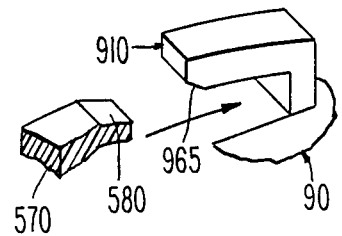
Figure 4E:
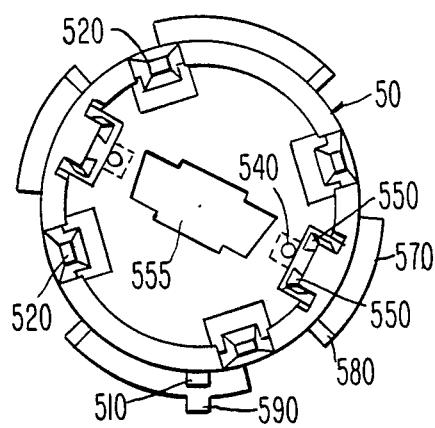
Figure 4C:
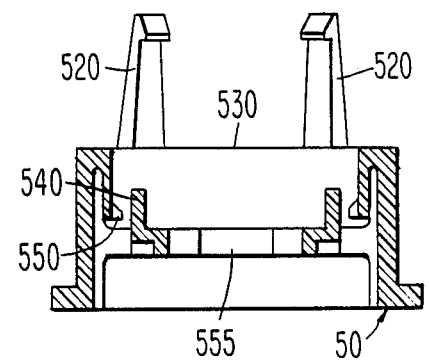
Figure 4D:
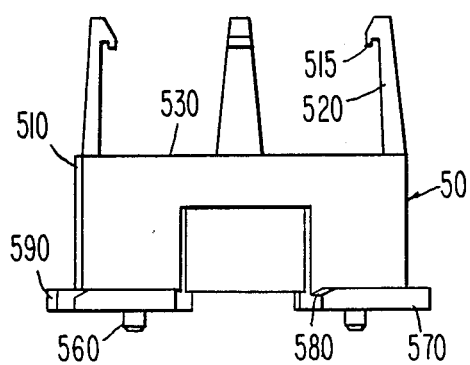

Referring to the top and bottom pictorial views respectively of FIGS. 3A and 3B and plan view 3C, the shoe 40 has a spherical shape 410 which allows for simultaneous tilt and swivel. A circular ring 420 extends from the spherical shape 410 in which are the assembly configurations for other parts (FIGS. 3B and 3H). A keyway 430 (FIGS. 3A and 3C) is provided for alignment to upper connector carrier 50. The shoe 40 is assembled to ball 70 by inserting annular ring 420 into slot 710 in the ball 70. (FIGS. 7A and 7B) The shoe 40 is pushed down until the snap tabs 460 (FIG. 3H) engage groove 720 in ball 70 (FIG. 7C) which prevents the shoe 40 from pushing out of the slot 710 when connectors 32,33 mate (FIGS. 2A and 11B). The fixed tabs 470 (FIG. 3H) prevent push out of shoe 40 when the monitor 10 is swiveled to the extreme left or right. The triangular-shaped key 480 (FIG. 2F and 3B) rotates in slot 710 in ball 70 and stops against the side of the slot 710. The positive "stop" provided by the key 480 is also used for assembly and disassembly of tilt ball assembly 20 in pedestal assembly 30. The snap tabs 490 (FIG. 3E) are strain reliefs for cables 38 exiting from the upper connector carrier 50 (FIG. 4A). Multiple sets of snaps (not detailed) are provided for different monitors 10 in which cable routings are different.

Referring to FIGS. 4A-4F, 8B and 11B, the upper connector carrier 50 (FIGS. 4A and 4E) is circular in shape to mate to the shoe 40. The upper connector carrier 50 supports and orients the upper connector 32 in the assembly. The rectangular key 590 (FIG. 4A) allows for one-way keying of tilt ball assembly 20 to pedestal 90. Another key 510 is also provided for orienting the shoe 40 during assembly. Locating pins 540 and snaps 550 are provided for locating and supporting upper connector 32 during assembly. The opening 555 (FIG. 4E) is keyed to prevent incorrect orientation of the upper connector 32. Splines 570 (FIG. 4A) engage ribs 960 (FIG. 11B) pedestal 90 and hold the tilt ball-/pedestal assembly 30 and monitor 10 together. The leading edges of the splines 570 and ribs 960 are beveled 965 and 580 (FIGS. 8B and 4A) so that during assembly rotation, the carrier 50 and spring retainer 60 are pulled down, preloading the springs 49 previously positioned on pins 440 in shoe 40 (FIG. 3A) and forcing connectors 32 and 33 to mating position. Pins 560 (FIG. 4D) are provided for transferring torque (via monitor 10 swivel) from the tilt ball assembly 20 to the lower connector carrier 80 which has the assembly locking configuration (FIGS. 6A-6D and 11B).

Ribs 515 are positioned behind ribs 615 on spring retainer 60 to prevent the snap tabs 520 from unlatching during handling.

The upper connector carrier 50 is assembled to the shoe 40 by inserting the carrier 50 from below while the key 510 in the upper carrier 50 engages the keyway 430 in shoe 40. The carrier 50 is pushed until the top surface 530 of the annular ring contacts the bottom surface 455 of ledge 450 on shoe 40 (FIG. 11B).

Figure 5A:
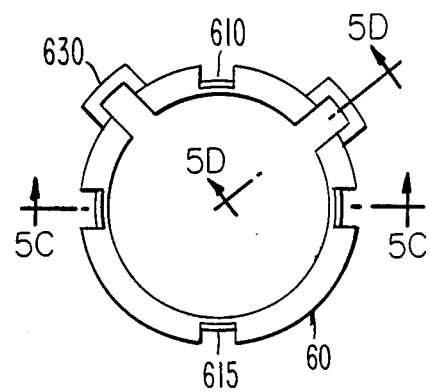
FIGS. 5A-5E show various views of the circular spring retainer subassembly of the tilt ball assembly of FIGS. 2A-2F.
Figure 5B:
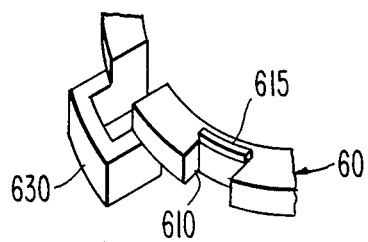
Figure 5C:
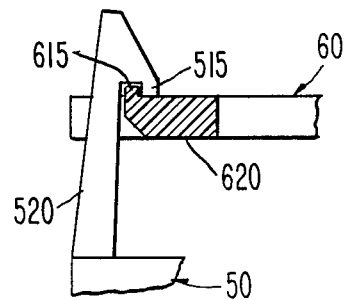
Figure 5D:
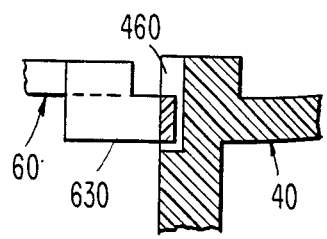
Figure 5E:
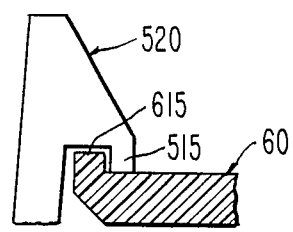
Figure 6A:
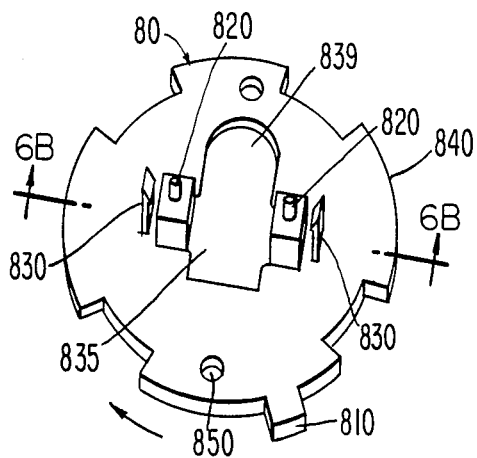
FIGS. 6A-6D show various view of the lower connector carrier subassembly of the pedestal assembly of FIGS. 2A-2F.
Figure 6B:
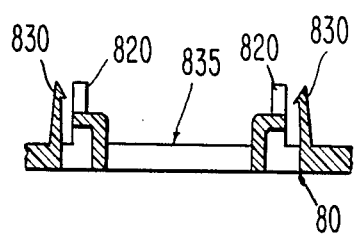
Figure 6D:
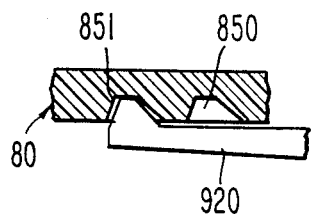
Figure 6C:
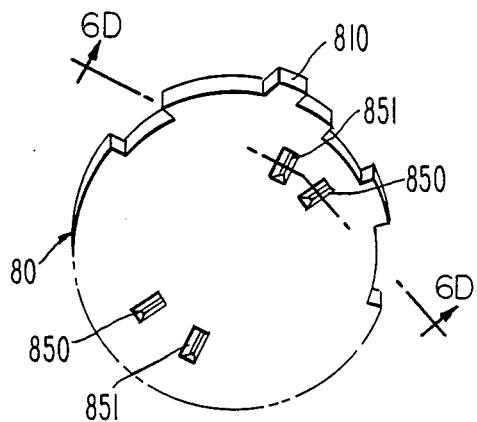

Referring to FIGS. 4A-4F and 11B, the spring 49 (FIG. 3A) is a compression type that provides tilt swivel sliding friction by preloading the tilt/swivel parts during assembly, thereby eliminating an adjusting screw or knob. Changing the sliding friction (caused by the preload) for other configurations is easily done by changing springs. Thus, the number of springs, free height, spring rate, number of coils and wire diameter can all be adjusted for optimum monitor tilt/swivel efforts. The springs 49 are located and held in place by round posts 440 on the shoe 40 (FIGS. 3F and 3G) and spring retainer 60. (FIG. 5A).

Referring to FIGS. 5A-5E and 11B, the spring retainer 60 is an annular ring with an outer diameter that fits the inside of the shoe 40 and an inside diameter that allows for assembly of upper connector 32. Slots 610 are provided for aligning to the snap tabs 520 on upper connector carrier 50. Assembly of the spring retainer preloads (compresses) springs 49 between the post support ledge 450 of the shoe 40 and the lower surface 620 of the spring retainer 60. One-way assembly is accomplished with cable slots 630 that nest in recesses 460 in shoe 40. (FIG. 3H).

Referring to FIGS. 7A-7C and 11B, the ball 70 is spherical with a slot 710 to allow movement of the shoe 40 which allows the proper tilt and swivel motion for the assembly. Hooks 720 and snaps 730 are provided for assembly to slots 10 and 130 in monitor 10. The channel 740 is provided for cables that exit the monitor (and are not connected in the tilt swivel assembly) on systems without connectors (that is no PC boards in pedestal 30). The front snaps 730 provide ease of manual assembly and disassembly. The ball 70 is assembled to monitor 10 by inserting the rear hooks 720 into the slots 120 in monitor 10 (FIG. 2A). The front snaps 730 are pushed up into the front slots 130 in monitor 10 until the snaps 730 engage. Prior to assembly, the monitor cable is inserted into snaps 490 on shoe 40 and coiled to allow movement without strain during tilt and swivel motions.

The pedestal assembly 30 includes the lower connector carrier 80 and the pedestal 90.

Figure 8A:
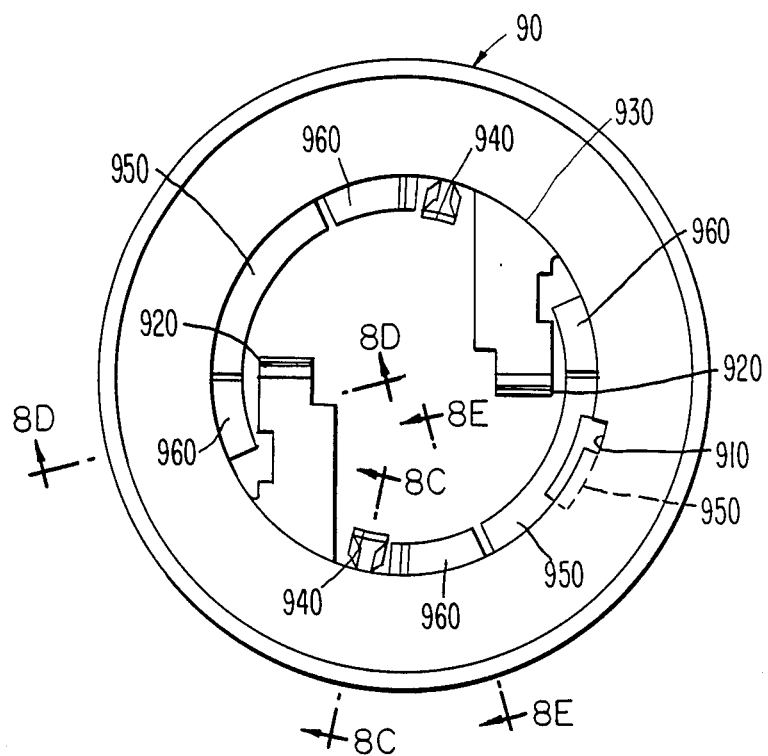
FIGS. 8A-8E show various views of the pedestal assembly of FIGS. 2A-2F.
Figure 8B:
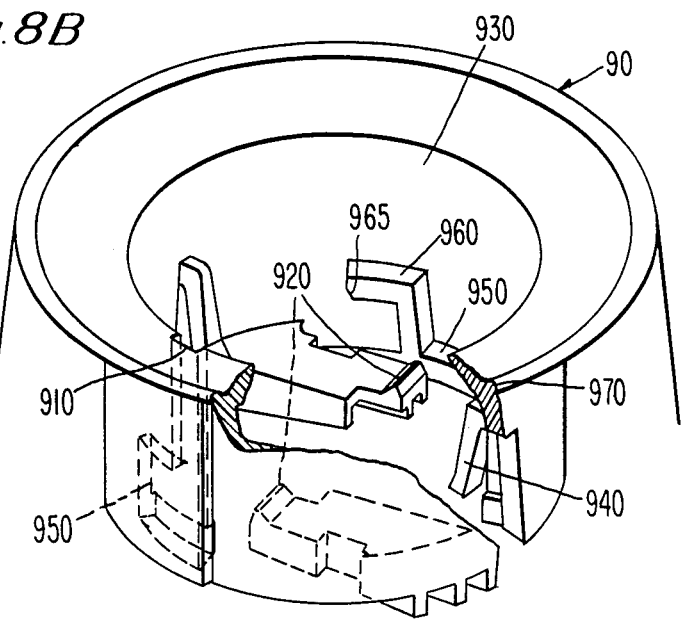
Figure 8E:
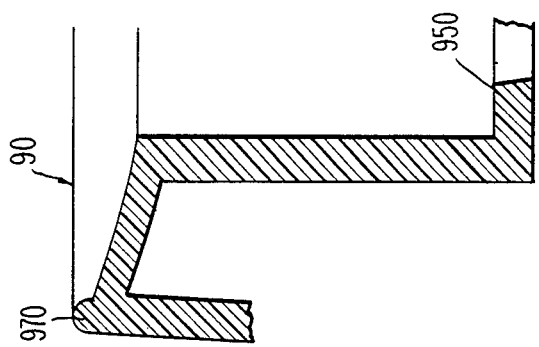
Figure 8D:
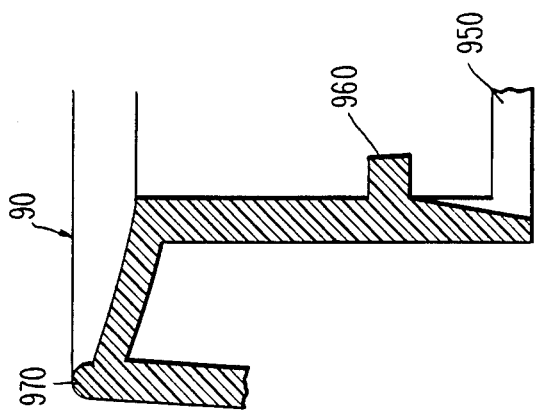
Figure 8C:
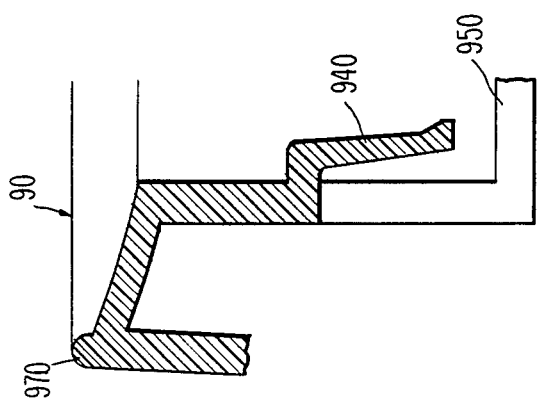
Figure 9A:
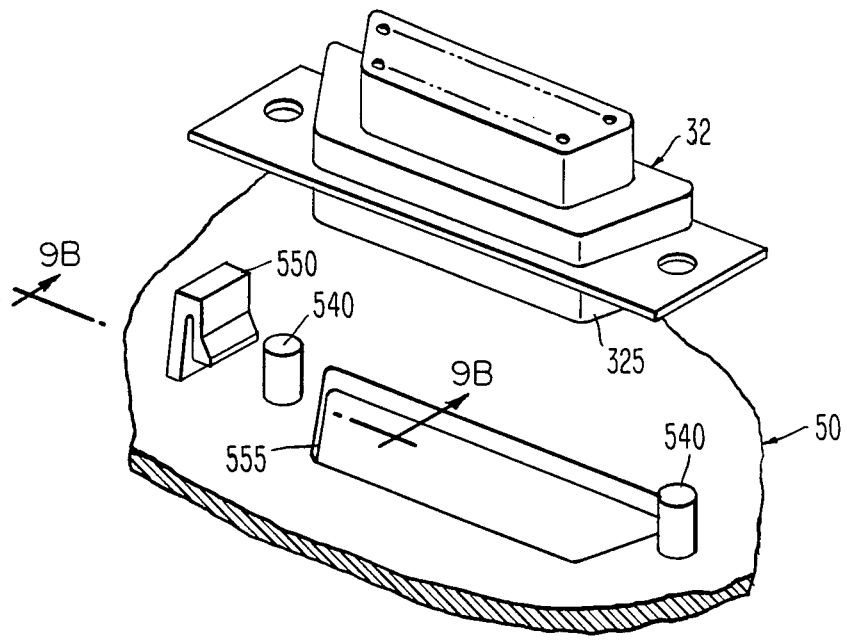
FIGS. 9A and 9B show how an electrical connector is mounted on the upper connector carrier of FIGS. 4A-4F.
Figure 9B:
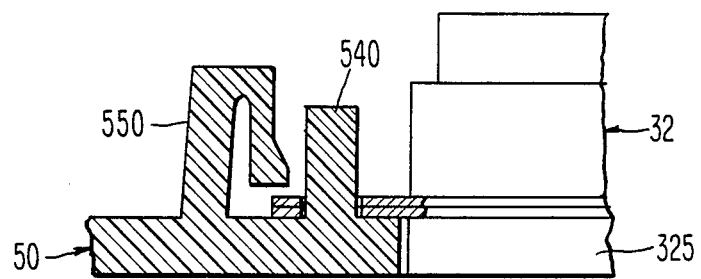
Figure 10A:
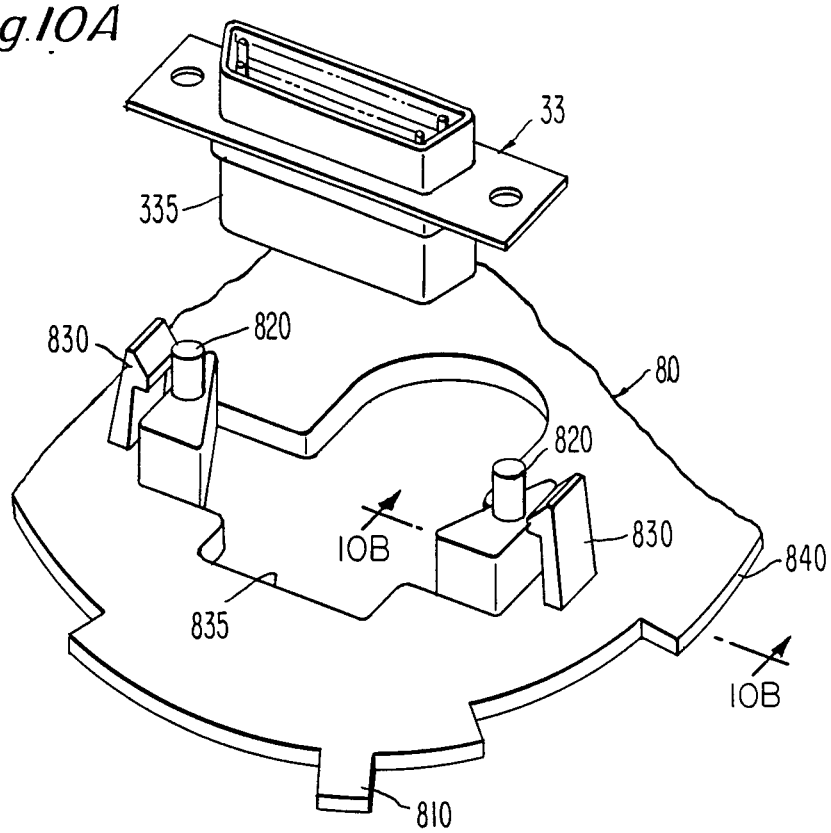
FIGS. 10A and 10B show how an electrical connector is mounted on the lower connector carrier of FIGS. 6A-6D.
Figure 11A:
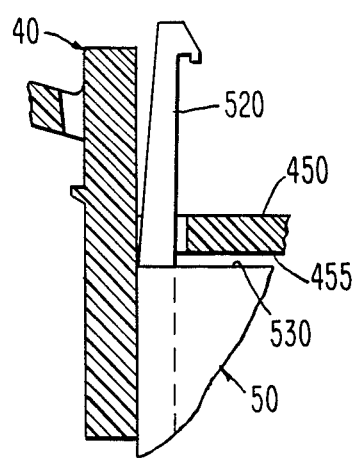
Figure 10B:
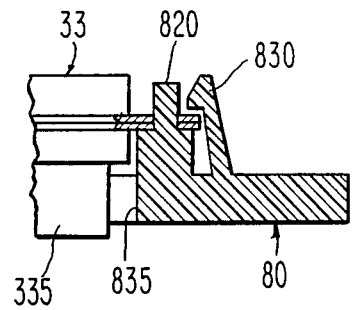

Referring to FIGS. 6A-6D and 11A, 11B, the lower connector carrier 80 is circular in shape with a key 810 that engages keyway 910 in pedestal 90, when rotated in the direction of the arrow in FIG. 8A. Pins 820 and snaps 830 serve the same functions as upper connector carrier 50 for the lower connector 33 which is keyed to the opening 835 to prevent improper connector orientation in assembly. The splines 840 serve the same function as those (570) in the upper connector carrier 50. Holes 850 are provided for engaging pins 560 in upper connector carrier 50 which transfers assembly torque. Recesses 850 and 851 engage snap tabs 920 in the bottom of circular opening 930 in pedestal 90. (FIGS. 8A and 8B). One set of recesses 851 holds the carrier 80 to prevent rotation during handling. The other set of recesses 850 engages pedestal snaps 920 via 18 degrees clockwise rotation. The configuration is designed to provide a light assembly torque and a high disassembly torque to prevent inadvertent unlatching of the tilt ball assembly 20 during normal swivel.

The slot 839 (FIG. 6A) allows connector 33 to be inserted through carrier 80 and dropped over the pins 820 and snap tabs 830. Assembly of the lower connector carrier 80 causes snap tabs 940 in pedestal 90 to engage, which keeps the carrier 80 properly seated on snap tabs 920 in pedestal 90. In pedestal 90, the snaps 920 prevent lower carrier 80 rotation during handling (from causing improper orientation for further tilt swivel assembly) and the snaps 940 prevent the carrier 80 from falling out during handling.

In a first embodiment, the pedestal 90 basically is a small stand on which the tilt ball assembly and monitor 10 are supported. The monitor cable exits through the channel 740 in the ball 70 to the system processor (FIG. 7A).

In a second embodiment, the pedestal 90 contains the system processor and related electronics. The monitor 10 and pedestal 90 are electrically connected in the tilt swivel area (FIGS. 2A and 11B).

The pedestal 90 (FIGS. 8A and 8B) has attached to the inner diameter 930, the following configurations:

1. Snap tabs 940 for retaining lower connector carrier 80.
2. Snap tabs 920 for anti-rotation of the lower carrier 80 during handling. These snaps 920 also provide assembly/disassembly torque for tilt ball assembly 20.
3. Keyway 910 for proper orientation of lower connector carrier 80 and upper connector carrier 50.
4. Recess 950 for allowing key 810 in lower connector carrier 80 and key 590 in upper connector 50 to rotate during assembly when the keys 590 (FIG. 4A) and 810 (FIG. 6A) are free of keyway 910 when fully seated.
5. Ledge 950 that supports the lower connector carrier 80.
6. Ribs 960 that during tilt ball assembly 20 rotation pull upper connector carrier 50 and spring retainer 60 down preloading springs 49. The ribs 960 in assembly overlap the splines 840 on lower and 570 on upper carriers preventing the tilt ball assembly 20 from coming out of pedestal 90 when monitor 10 is lifted.
7. Beveled edges 965 on ribs 960 force upper connector carrier 50 down via splines 570 during 18 degree assembly rotation which also properly seats connectors 32 and 33 together.

Referring to FIGS., 9A, 9B and 10A, 10B, the present invention utilizes "D" type electrical connectors 32 and 33 which by virtue of their standard shapes can easily be keyed in assembly. The connectors have shells 325 and 335 that protrude into and are keyed by openings 555 and 835 in upper and lower connector carriers 50 and 80.

The connectors 32 and 33 are assembled into harnesses prior to assembly.

The preceding detailed description has presented merely a preferred embodiment of the present invention. It will be understood that numerous other alternative embodiments encompassing many variations could be employed without departing from the spirit and scope of the invention as set forth in the following claims.

What is claimed is:

1. A tilt-swivel assembly for a terminal monitor comprising:
   a base support including (1) a horizontal stand portion which is adapted to rest on a table and (2) a central hollow, open-ended cylinder, a plurality of locking members inside said cylinder; and
   a vertical keyway inside said cylinder;
   a lower connector carrier seated inside said cylinder, with a lower key in said keyway, and carrying a lower electrical connector and its leads, said lower connector carrier being held in place by said locking members; and
   an assembly coupled to said base support including an upper connector carrier carrying an upper connector and its wires with said lower and upper connectors being connected together, said upper connector carrier having an upper key seated in said keyway;
   a cylindrical member coupled to said upper connector carrier and having an annular flange at its upper end,
   a coupling member, in the shape of a section of a sphere, having a slot in its body said coupling member being adapted to be secured to the cabinet of a terminal monitor,
   the flange of said cylindrical member being pivotably and slidably coupled to said coupling member in the slot therein whereby, when said coupling member slides in said slot with respect to said spherical section, said monitor tilts and, when said coupling member turns with respect to said spherical section in said slot, said monitor rotates.

2. A tilt-swivel assembly for a terminal monitor comprising:
   a base support including (1) a horizontal stand portion which is adapted to rest on a table and (2) a central hollow, open-ended cylinder, a plurality of locking members inside said cylinder, and
   a vertical keyway inside said cylinder;
   a lower connector carrier seated inside said cylinder and with a lower key in said keyway and carrying a lower electrical connector and its leads, said lower connector carrier being held in place by said locking members; and
   an assembly coupled to said base support including an upper connector carrier carrying an upper connector and its wires with said lower and upper connectors being connected together, said upper connector carrier having an upper key seated in said keyway,
   a cylindrical member coupled to said upper connector carrier and having an annular flange at its upper end, and an internal vertical keyway which receives a vertical key on an outer surface of said upper connector carrier,
   a coupling member, in the shape of a section of a sphere, having a slot in its body, said coupling member being adapted to be secured to the cabinet of a terminal monitor,
   the flange of said cylindrical member being pivotably and slidably coupled to said coupling member in the slot therein whereby, when said coupling member slides in said slot with respect to said spherical section, said monitor tilts and, when said coupling member turns with respect to said spherical section in said slot, said monitor rotates.

3. A tilt-swivel assembly for a terminal monitor comprising:
   a base support including (1) a horizontal stand portion which is adapted to rest on a table and (2) a central hollow, open-ended base cylinder, a plurality of first locking members formed on the inside wall of said cylinder and second locking members extending across an open lower end of said cylinder, and a vertical base keyway inside said base cylinder;

a lower connector carrier seated inside said cylinder, having a lower key extending from its periphery and seated in said keyway, and carrying a lower electrical connector and its leads, said lower connector carrier being held in place by some of said first locking members and by said second locking members;

an assembly coupled to said base support including an upper connector carrier carrying an upper electrical connector and its wires, with said lower and upper connectors being connected together, said upper connector carrier having an upper key extending from its periphery and seated in said base keyway, a cylindrical member coupled to said upper connector carrier and having an annular flange at its upper end and an internal vertical keyway which receives a vertical key on an outer surface of said upper electrical connector carrier, a coupling member, in the shape of a section of a sphere, having a slot in its body, said coupling member being adapted to be secured to the cabinet of a terminal monitor, the flange of said cylindrical member being pivotably and slidably coupled to said coupling member in the slot therein whereby, when said coupling member slides in said slot with respect to said spherical section, said monitor tilts and, when said coupling member turns with respect to said spherical section in said slot, said monitor rotates.

* * * * *